(12) United States Patent
Bratsch

(10) Patent No.: US 11,285,525 B2
(45) Date of Patent: Mar. 29, 2022

(54) TESTING LID FOR A CAN CLOSER

(71) Applicant: XOLUTION GMBH, Munich (DE)

(72) Inventor: Christian Bratsch, Salzburg (AT)

(73) Assignee: XOLUTION GmbH, Munich (DE)

( * ) Notice: Subject to any disclaimer, the term of this patent is extended or adjusted under 35 U.S.C. 154(b) by 165 days.

(21) Appl. No.: 16/340,533

(22) PCT Filed: Sep. 12, 2017

(86) PCT No.: PCT/EP2017/072850
§ 371 (c)(1),
(2) Date: Apr. 9, 2019

(87) PCT Pub. No.: WO2018/068966
PCT Pub. Date: Apr. 19, 2018

(65) Prior Publication Data
US 2020/0049588 A1    Feb. 13, 2020

(30) Foreign Application Priority Data
Oct. 10, 2016   (EP) ..................... 16193005

(51) Int. Cl.
| | |
|---|---|
| *G01M 13/00* | (2019.01) |
| *B21D 51/26* | (2006.01) |
| *B21D 51/30* | (2006.01) |
| *B21D 51/44* | (2006.01) |
| *B65B 7/28* | (2006.01) |
| *B65D 43/00* | (2006.01) |

(52) U.S. Cl.
CPC ......... *B21D 51/26* (2013.01); *B21D 51/2653* (2013.01); *B21D 51/30* (2013.01); *B21D 51/44* (2013.01); *B65B 7/28* (2013.01); *B65D 43/00* (2013.01); *G01M 13/00* (2013.01)

(58) Field of Classification Search
CPC ..................................................... G01M 13/00
See application file for complete search history.

(56) References Cited

U.S. PATENT DOCUMENTS 3,848,396 A * 11/1974 Schmidt ............... B65B 7/2842
                                                           53/489
4,218,984 A    8/1980 Rhinefrank et al.
4,230,028 A * 10/1980 Knudsen ............... B21D 51/46
                                                           413/47

(Continued)

FOREIGN PATENT DOCUMENTS

JP       S51163454 U    12/1976
JP       2000271687 A   10/2000

*Primary Examiner* — Eric S. McCall
(74) *Attorney, Agent, or Firm* — Dykema Gossett PLLC

(57) ABSTRACT

The present invention relates to a testing lid for testing the stroke of a holding plate of a closure head of a can closing device for cans, in particular beverage cans, the testing lid comprising: an edge portion provided for positioning onto a can edge, in particular for additional crimping with the can edge; and an inner portion, in which one or a plurality of testing pins are arranged in a force-fitting manner, the testing pins being displaceable by the holding plate in the direction of stroke while a stroke of the holding plate is taking place. The invention additionally relates to a method of testing the stroke of a holding plate of a closure head of a can closing device for cans making use of the testing lid according to the present invention.

16 Claims, 2 Drawing Sheets

(56) References Cited

U.S. PATENT DOCUMENTS

| | | | |
|---|---|---|---|
| 4,518,094 A | 5/1985 | Kodman | |
| 4,683,706 A * | 8/1987 | Harper | B65B 7/285 53/314 |
| 5,328,314 A * | 7/1994 | Marchadour | B65B 7/2857 413/37 |
| 2007/0107554 A1 * | 5/2007 | Yeager | B67B 7/18 81/3.33 |
| 2012/0103984 A1 | 5/2012 | Kasper | |

* cited by examiner

TESTING LID FOR A CAN CLOSER

CROSS-REFERENCE TO RELATED APPLICATIONS

This application is a national stage filing based upon International PCT Application No. PCT/EP2017/072850, filed 12 Sep. 2017, which claims the benefit of priority to European application No. 16193005.2, filed 10 Oct. 2016.

FIELD OF THE INVENTION

The present invention relates to a testing lid for testing the stroke of a holding plate of a closure head of a can closer/can closing device.

PRIOR ART

In beverage can filling processes, the cans pass through a can closing device after having been filled, the filled can bodies coming in via a feed path and can lids coming in via a further feed path. The can closing device normally has a plurality of stations of the same kind, which are arranged like a carousel and in each of which a respective can is closed with a lid. The lids are here guided onto the cans and held thereon by a holding plate of a closure head. Such holding also serves to fix the cans, so as to prevent them from escaping, due to the centrifugal force, from the circular path along which the cans move in the closing device. In the closing device, the cans are crimped with the lid on the edge side and are thus closed. Normally, the can with the lid additionally rotates about its own axis of symmetry during this process.

The respective holding plates have here a preset stroke, which must be adjusted for a specific type of cans before the closing device is put into operation. An exact adjustment of the stroke is important insofar as, if the stroke of the holding plate approaching the lid from above is too small, the can body and the lid will not be fixed sufficiently in the respective station. If the stroke is too large, the lid will be bent, and this is not desired either. With certain types of lids, opening devices arranged in the lid and used for opening the can by a consumer may even be destroyed.

Therefore, the stroke of the holding plates must be checked regularly and readjusted, if necessary. According to the prior art, checking is, however, only possible directly by a direct measurement of the displacement of the holding plate. This entails an interruption of the filling operation and a machine downtime of several hours may be caused.

DESCRIPTION OF THE INVENTION

It is the object of the present invention to overcome the above-mentioned drawbacks at least partially.

The testing lid according to the present invention is suitable for testing the stroke of a holding plate of a closure head of a can closing device for cans, in particular beverage cans, the testing lid comprising: an edge portion provided for positioning onto a can edge, in particular for additional crimping with the can edge; and an inner portion, in which one or a plurality of testing pins are arranged in a force-fitting manner, the testing pins being displaceable by the holding plate in the direction of stroke while a stroke of the holding plate is taking place.

The testing lid according to the present invention is advantageous insofar as the stroke of the holding plates can be tested while the can closing device is in operation. The testing lid is used instead of the lid actually intended for the can in question. The edge area of the testing lid therefore resembles the edge area of the lid for the can in question and is crimped with the edge area of the can body in a corresponding manner. The holding plate applies pressure to the testing pin or testing pins and pushes them in a little further. After having passed through the closing device, the can closed with the testing lid is led out and subjected to inspection by the operating personnel. If the pins have not been displaced at all, the set stroke of the holding plate is too small, and if one or a plurality of pins have been pushed in completely, so that their ends are flush with the surface of the testing lid, the set stroke is too large and the can closing operation may result in bending or even damaging of the lid surface. If, however, the testing pins have only been partially pressed in, the set stroke is correct and there is no need to interrupt the operation in order to measure and adjust the stroke.

The testing lid according to the present invention can be further developed such that the inner portion may be provided as an insert, which is inserted in the edge portion, in particular in a form-fitting and/or force-fitting manner. This is advantageous insofar as a conventional lid can be used as a starting product for the testing lid and a part appropriate for the insert is removed, while the edge area, which is intended for connection with a can body, remains as the edge area of the testing lid.

This, in turn, can be further developed such that the insert can be removed from the edge portion, in particular after testing has been carried out. This allows the position of the testing pins to be easily examined, in particular also in the direction of the inner side of the can after crimping of the edge area of the testing lid with a can body.

According to another development, the inner portion may be made of plastic and/or the testing pins may be made of plastic.

Another further development is to be seen in that the testing pins are provided in an arrangement comprising one or a plurality of rows of testing pins. In this way, the stroke of the holding plate can be tested across the cross-section, so that also an angular position can be examined and an undesired oblique position can be detected in this way, by way of example.

This can be further developed insofar as the arrangement of the testing pins may comprise two crossed rows of testing pins, in particular wherein the two rows are arranged at right angles to one another. This leads to an advantageous distribution of the testing pins across the testing lid.

According to another further development, the inner portion may comprise a reinforced area, in which the testing pins are provided. This is of advantage, since the testing pins will then be reliably guided and can e.g. be prevented from bending over.

Another further development is to be seen in that the testing pins have markings for indicating the position, in particular color and/or line markings. This makes it easier to read and identify the position of the testing pins, both before and after passage through the can closing device.

The method disclosed by the present invention and used for testing the stroke of a holding plate of a closure head of a can closing device for cans, in particular for beverage cans, during operation of the can closing device, comprises the following steps: providing a testing lid according to the present invention or one of its further developments within a stack of can lids on a feed path to the can closing device; pressing the testing lid onto a can body with the holding plate of the closure head; removing the can with the testing lid from a discharge path for closed cans; and examining the position of the testing pins of the testing lid.

The advantages of the method according to the present invention and of its further developments correspond—unless otherwise stated—to those of the testing lid according to the present invention.

According to a further development of the method according to the present invention, the additional step of: crimping a peripheral part of the edge portion with an edge portion of the can body, may be provided after the step of pressing-on.

Another further development resides in that the insert may be removed from the edge portion of the testing lid.

According to another further development, the can closing device may comprise a plurality of closure heads and, for testing the stroke of the respective holding plate, a suitable number of testing lids may be provided on the feed path in immediate succession.

Another further development resides in that the stroke of one or of a plurality of holding plates is adjusted, if it is detected that at least one testing pin exceeds a predetermined limit value of displacement.

According to another further development the step of testing the position of the testing pins of the testing lid may comprise the following step: checking the position of markings, in particular of color and/or line markings, arranged on the testing pins for indicating the position.

The above-mentioned further developments may be used individually or they may be combined with one another in a suitable manner, as claimed.

Further features and exemplary embodiments as well as advantages of the present invention will be explained in more detail hereinafter making reference to the drawings. It goes without saying that the embodiments do not exhaust the scope of the present invention. In addition, it goes without saying that some of the features or all the features described hereinafter may also be combined with one another in some other way.

EMBODIMENTS

Figure 1:
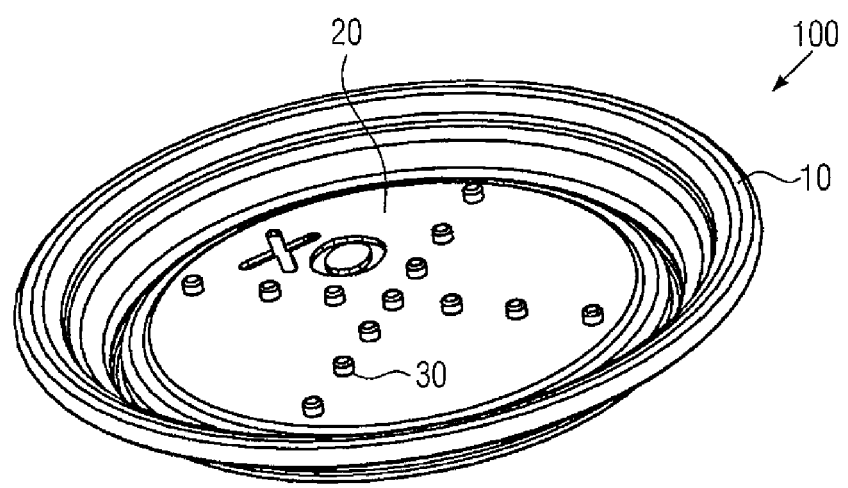
FIG. 1 shows an embodiment of the testing lid according to the present invention.

FIG. 1 shows an embodiment of the testing lid according to the present invention.

The testing lid 100 according to the present invention is suitable for testing the stroke of a holding plate of a closure head of a can closing device for beverage cans, the testing lid 100 according to this embodiment comprising: an edge portion 10 provided for positioning onto a can edge, in particular for additional crimping with the can edge; and an inner portion 20, in which one or a plurality of testing pins 30 are arranged in a force-fitting manner, the testing pins 30 being displaceable by the holding plate in the direction of stroke while a stroke of the holding plate is taking place.

The inner portion 20 is provided as an insert 20. The insert 20 as well as the testing pins 30 are made of plastic material. The arrangement of the testing pins 30 comprises two crossed rows of testing pins 30, the two rows being arranged at right angles to one another.

Figure 2:
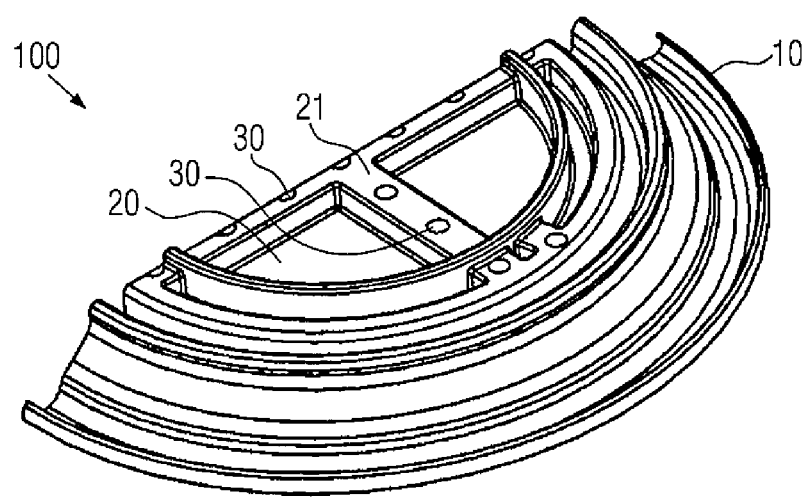
FIG. 2 shows a cross-section of the testing lid according to FIG. 1.

FIG. 2 shows a cross-section of the testing lid 100 according to FIG. 1.

The cross-sectional view shows that the edge portion 10 of the testing lid 100 is formed in accordance with a can edge normally provided for the cans, so that the edge portion 10 can be crimped with the upper edge of the can in a closing process. Likewise, it can be seen that in this embodiment the insert 20 has a reinforced area 21, in which the testing pins 30 are provided.

Figure 3:
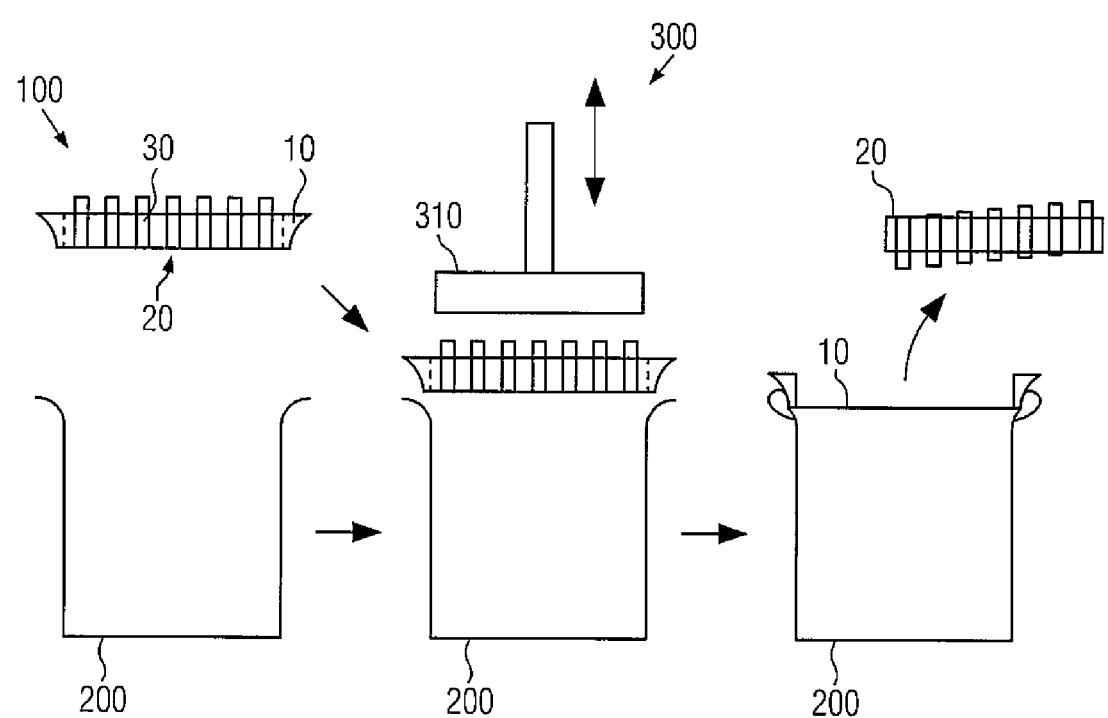
FIG. 3 shows schematically the testing method according to the present invention.

FIG. 3 shows a schematic representation of the testing method according to the present invention.

The testing lid 100 and a can body 200 are, when the can body 200 has been filled (e.g. with a beverage), fed on respective feeding paths to a downstream closing device 300. In addition to the actual devices provided for crimping the edge, the closing device further comprises a holding plate 310 by means of which the lids and in the present case also the testing lid 100 are held in position on the can body 200. The testing pins 30 of the testing lid 100 are displaced by the holding plate. The edge portion 10 of the testing lid 30 is crimped with the upper edge of the can body. Subsequently, the insert 20 can be removed from the testing lid 100 and the position of the individual testing pins 30 can be examined.

If excessive deviations from an optimum stroke of the holding plate 310 are detected, the closing device 300 must be stopped and the stroke readjusted.

The embodiments shown are only of an exemplary nature and the complete scope of the present invention is defined by the claims.

The invention claimed is:

1. A testing lid for testing the stroke of a holding plate of a closure head of a can closing device for cans, the testing lid comprising:
    an edge portion configured and arranged to be positioned onto a can edge and to be crimped with the can edge;
    an inner portion; and
    one or more testing pins are coupled in a force-fitting manner to the inner portion, the one or more testing pins configured and arranged to be displaceable by the holding plate in a stroke direction during a stroke of the holding plate;
    wherein the inner portion is an insert which is inserted in the edge portion; and
    wherein the insert is configured and arranged to be removable from the edge portion after testing has been carried out.

2. The testing lid according to claim 1, wherein the inner portion includes a reinforced area, in which the one or more testing pins are provided.

3. The testing lid of claim 1, wherein the insert is inserted into the edge portion in a form-fitting and/or force-fitting manner.

4. The testing lid according to claim 1, wherein the inner portion is plastic.

5. The testing lid of claim 4, wherein the one or more testing pins are made of plastic.

6. The testing lid according to claim 1, wherein the one or more testing pins have markings configured and arranged for indicating position.

7. The testing lid of claim 6, wherein the testing pin markings are color and/or line markings.

8. A method of testing the stroke of a holding plate of a closure head of a can closing device for cans during operation of the can closing device, the method comprising the following steps:

providing a testing lid within a stack of can lids on a feed path to the can closing device;

pressing the testing lid onto a can body with the holding plate of the closure head;

removing the can with the testing lid from a discharge path for closed cans; and based on the position of one or more testing pins of the testing lid, the stroke of the holding plate is determined.

9. The method according to claim 8, wherein the can closing device includes a plurality of closure heads and, for testing the stroke of the respective holding plate, a number of testing lids, which are configured and arranged to be fed on to the feed path in succession.

10. The method according to claim 8, further comprising the step of:

adjusting the stroke of the holding plate, in response to at least one testing pin of the one or more testing pins exceeding a predetermined limit value of displacement.

11. The method according to claim 8, wherein, after the step of pressing the testing lid onto a can body, the following additional step is provided:

crimping a peripheral part of an edge portion of the testing lid with a can edge portion of the can body.

12. The method according to claim 11, further comprising the step of:

removing an inner portion from the edge portion of the testing lid.

13. The method according to claim 8, further including the step of testing the position of the one or more testing pins of the testing lid which includes checking the position of markings on the one or more testing pins.

14. The method according to claim 13, wherein the markings on the one or more testing pins are color and/or line markings configured and arranged for indicating the position.

15. A testing lid for testing the stroke of a holding plate of a closure head of a can closing device for cans, the testing lid comprising:

an edge portion configured and arranged to be positioned onto a can edge and to be crimped with the can edge;

an inner portion; and testing pins that are coupled in a force-fitting manner to the inner portion, the testing pins configured and arranged to be displaceable by the holding plate in a stroke direction during a stroke of the holding plate;

wherein the testing pins are arranged in two crossed rows.

16. The testing lid of claim 15, wherein the two rows of the testing pins are arranged at right angles relative to one another.

* * * * *